United States Patent
Landgraf et al.

(10) Patent No.: US 6,762,513 B2
(45) Date of Patent: Jul. 13, 2004

(54) ELECTRICAL ACCESSORY DEVICE CONTROLLING SYSTEM FOR A MOTOR VEHICLE AND PROCESS FOR OPERATION THEREOF

(75) Inventors: Hans-Peter Landgraf, Gauting (DE); Robert Hupfer, Babenhausen-Klosterbeuren (DE)

(73) Assignee: Webasto Thermosysteme International GmbH, Stockdorf (DE)

(*) Notice: Subject to any disclaimer, the term of this patent is extended or adjusted under 35 U.S.C. 154(b) by 0 days.

(21) Appl. No.: 10/192,854

(22) Filed: Jul. 11, 2002

(65) Prior Publication Data
US 2003/0052649 A1 Mar. 20, 2003

(30) Foreign Application Priority Data
Jul. 11, 2001 (DE) ............................. 101 33 098

(51) Int. Cl.[7] .............................. B60R 22/00; H02J 7/00
(52) U.S. Cl. ...................... 307/10.6; 307/10.7; 320/104
(58) Field of Search ................................. 302/135, 104, 302/103, 163, 157, 153, 162, 152; 307/10.7, 10.8, 38, 39, 40, 125

(56) References Cited

U.S. PATENT DOCUMENTS

| 4,990,885 | A | * | 2/1991 | Irick et al. ............... 340/455 |
| 5,691,619 | A | | 11/1997 | Vingsbo ....................... 307/86 |
| 5,693,986 | A | | 12/1997 | Vettraino, Jr. et al. ..... 307/10.7 |
| 5,764,469 | A | | 6/1998 | Slepian et al. ................ 361/92 |
| 5,929,604 | A | | 7/1999 | Irvin ........................... 320/136 |
| 6,330,463 | B1 | | 12/2001 | Hedrich ....................... 455/573 |
| 6,545,445 | B1 | * | 4/2003 | McDermott et al. ........ 320/103 |

FOREIGN PATENT DOCUMENTS

| DE | 195 17 742 A1 | 11/1996 |
| DE | 197 57 362 A1 | 6/1999 |
| EP | 0 636 520 A1 | 2/1995 |

* cited by examiner

Primary Examiner—Rajnikant B Patel
(74) Attorney, Agent, or Firm—Nixon Peabody LLP; David S. Safran

(57) ABSTRACT

An electrical accessory device controller system and process for controlling for a motor vehicle having a vehicle battery and an alternator. The system is provided with an electrical interface for an electrical accessory device, a device for detecting the voltage of the vehicle electrical system, and a power supply control unit to connect the electrical accessory device to the battery according to the detected battery voltage or to disconnect the electrical accessory device from it. Furthermore, there is an auxiliary energy storage device rechargeable by the alternator and which is connected to the power supply control unit. The power supply control unit is made such that depending on the detected voltage of the vehicle electrical system it electrically connects the auxiliary power storage device to the electrical accessory device to the battery or disconnects the electrical accessory device from it.

10 Claims, 1 Drawing Sheet

ELECTRICAL ACCESSORY DEVICE CONTROLLING SYSTEM FOR A MOTOR VEHICLE AND PROCESS FOR OPERATION THEREOF

BACKGROUND OF THE INVENTION

1. Field of the Invention

This invention relates to an electrical accessory device controller system for a motor vehicle and a process for its operation. More specifically, the invention relates to a motor vehicle power supply monitoring and controlling system for protecting a motor vehicle battery from being exhausted by a motor vehicle electrical accessory device.

2. Description of Related Art

U.S. Pat. No. 5,764,469 discloses an apparatus for protecting devices in a vehicle from voltage spikes and preventing the electronic devices from discharging a vehicle battery. The apparatus includes a power supply control unit for the electrical devices wherein the control unit is made such that three predetermined threshold values of a motor vehicle battery voltage are detected. When it is detected that the first threshold value is not reached, a warning signal is output to the vehicle's operator; and, when the second, lower threshold value is not reached, the electrical devices are disconnected from the motor vehicle battery, in order to prevent exhaustive discharge thereof and to ensure startability of the motor vehicle. Re-connection of the electrical devices takes place when it is detected that a third threshold value which is higher than the first and the second threshold value is exceeded.

Other systems, in which exhaustive discharge protection of the motor vehicle battery is accomplished by monitoring the battery voltage and optionally shutting off electrical devices when given threshold values are not reached, are known, as shown, for example, in published European Patent Application EP 0 636 520 A1 and U.S. Pat. No. 5,691,619.

U.S. Pat. No. 5,693,986 discloses exhaustive discharge protection for a vehicle battery, in which electrical loads, which remained on after the operator has exited the vehicle, are disconnected from the battery.

U.S. Pat. No. 5,929,604 discloses exhaustive discharge protection for a vehicle battery in which a mobile phone system powered by a vehicle battery is turned off when the measured power consumption of the telephone system over time has exceeds a given threshold value. The telephone system is turned on when a power flow to the vehicle battery from the motor vehicle's alternator is established.

Published German Patent Application DE 195 17 742 A1 discloses a power supply for a motor vehicle in which there are a starter battery and a separate supply battery. Exhaustive discharge protection for both batteries is accomplished by monitoring the respective battery voltage, and when the respective battery voltage drops below a predetermined threshold value, the corresponding battery being separated from the consumer electrical system or the vehicle electrical system.

SUMMARY OF THE INVENTION

It is an object of this invention is to provide device for a motor vehicle and a corresponding process for operation thereof which, on the one hand, accomplishes exhaustive discharge protection of the vehicle battery, and on the other hand, enables an operating time of the motor vehicle's electrical accessory devices as long a possible without the motor vehicle's alternator running.

In an embodiment of the present invention, by providing an auxiliary power storage device for the motor vehicle electrical accessory devices in combination with monitoring of the voltage of the vehicle electrical system, the disconnecting of the electrical accessory devices from the vehicle battery takes place when given threshold values of the voltage of the vehicle electrical system are reached. On the one hand, exhaustive discharge of the vehicle battery, which can entail shortening of the battery service life and starting problems, can be avoided, and on the other, the auxiliary energy storage device prolongs the operating duration of the electrical accessory devices without harmfully depleting the vehicle battery and, hence, protects the vehicle battery. The latter is accomplished especially in that, after a first threshold value of the voltage of the vehicle electrical system is reached, the power to the electrical accessory devices is provided from the auxiliary energy storage device and subsequently from the vehicle battery for a predetermined period of time.

The electrical accessory device in an embodiment of the invention is an auxiliary heating device, and a remote control for controlling battery shut-off timings is preferably a wireless data transmission means, especially a means according to a mobile telecommunication standard, and/or a control device for the auxiliary heating device.

The invention is further described below using several embodiments shown in the drawings.

DETAILED DESCRIPTION OF THE INVENTION

Figure 1:
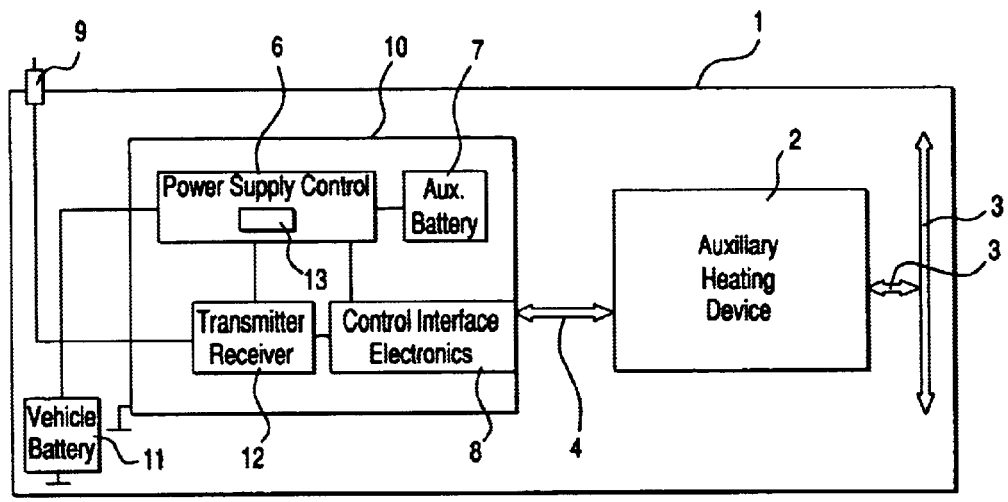
FIG. 1 schematically shows a block diagram of an electrical accessory device controller of the present invention in a the motor vehicle.

According to FIG. 1 there is auxiliary heating device 2 in the motor vehicle 1 which, on the one hand, is connected to the motor vehicle bus system 3, and on the other hand, via an interface 4 to the control electronics module 10. The electronics module 10 comprises a power supply control unit 6, an auxiliary energy storage device, e.g., battery, 7, control/interface electronics 8, a GSM transmitter/receiver 12 and a GSM antenna 9 connected to the GSM transmitter/receiver 12. The vehicle battery 11 is connected to the power supply control unit 6 and is used as a power source for the control electronics module 10. The power supply control unit 6 is further connected to the auxiliary battery 7 while it is connected to an output side of the GSM module 12 and to the control/interface electronics 8. The control/interface electronic is connected to the interface 4, in order to control the auxiliary heating device 2.

The GSM module 12 is used to accomplish remote control of the auxiliary heating device 2 via a mobile telecommunications network, and the operator of the vehicle can from his mobile telephone, for example, input a starting time for turning on the auxiliary heating device or also directly input a starting command for the auxiliary heating device or to control certain system parameters such as, for example, the heat output.

When the vehicle is traveling, i.e., with the engine running, the power supplied to the control electronics module 10 is provided via the connection to the vehicle battery 11 which is continually recharged by the motor vehicle alternator. Hence, in this respect with the engine running, power supply ultimately is provided via the motor vehicle alternator. The power supply control unit 6 is made such that, with the alternator running, the auxiliary battery 7 is recharged or kept in the charged state.

The power supply control unit 6 is provided with a means 13 for measuring the voltage of the vehicle electrical system in order to monitor the charged state of the vehicle battery 11.

Figure 2:
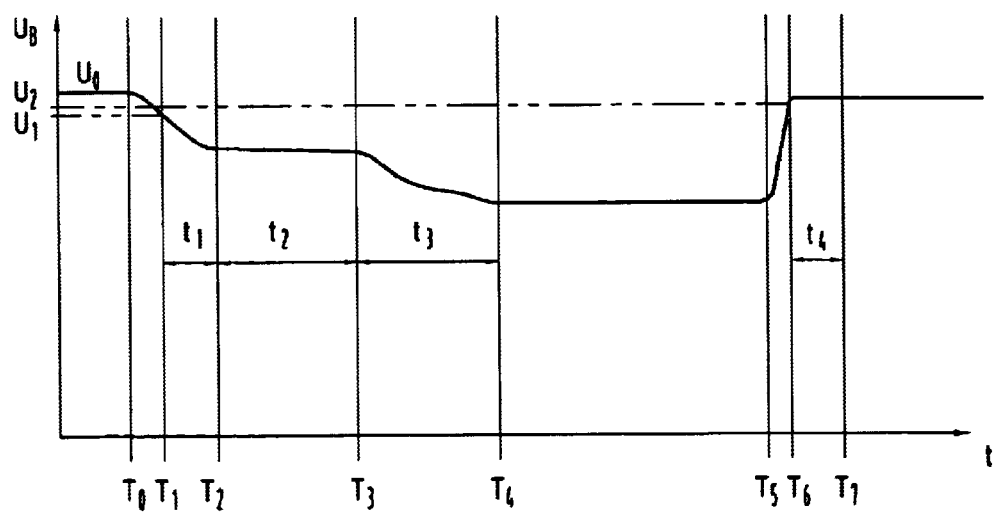
FIG. 2 shows the voltage of the vehicle electrical system plotted over time in an example of a battery discharge process.

FIG. 2 shows sample behavior of the voltage $U_B$ of the vehicle electrical system to explain the manner of operation of the power supply control unit 6.

The voltage of the vehicle electrical system with the alternator running, i.e., a condition in which the battery 11 is generally completely charged, is labeled $U_0$. Time $T_0$ indicates the time at which the alternator, hence the vehicle engine, is shut off.

As a result of the power demand from the control electronics module 10 and the alternator being off at time $T_0$, the discharging of the battery 11 begins, as indicated by the decreasing of the voltage of the vehicle electrical system $U_B$ which also corresponds to the vehicle battery voltage, until the time $T_1$ where a first threshold value $U_1$ is reached. The detection of the first threshold value $U_1$ being reached starts a timer in the power supply control unit 6. After the expiration of a fixed time interval $t_1$, during which the battery voltage $U_B$ has not risen again above the threshold value $U_1$, at time $T_2$ the status of the alternator being off and the vehicle is parked is confirmed. Based on this determination, the power supply control unit 6 disconnects the vehicle battery from the control electronics module 10 at time $T_2$. At $T_2$ power is supplied instead via the auxiliary battery 7 over a fixed time interval $t_2$ so that the vehicle battery 11 is not further discharged by the control electronics module 10. That is, over the time interval $t_2$, the battery voltage $U_B$ remains essentially constant. After expiration of the time interval $t_2$, which is preferably set such that the auxiliary battery 7 in this time interval is essentially discharging, at time $T_3$ the power supply control unit 6 switches the power supply of the control electronics module 10 to the vehicle battery 11 again for a predetermined time interval $t_3$ so that the vehicle battery 11 further discharges to a certain extent. After expiration of the time interval $t_3$, at time $T_4$, the power supply control unit 6 disconnects the control electronics module 10 from the vehicle battery 11 to prevent a complete exhaustive discharge of the vehicle battery 11 and possible subsequent starting problems.

The power supply control unit 6 for the vehicle is thus designed such that a minimum residual charge of the battery 11 is ensured to allow reliable starting of the motor vehicle and to prevent damage to the vehicle battery 11 caused by repeated exhaustive discharges, while maintaining the operability of the control electronics module 10 as long as possible by using the auxiliary battery 7 to achieve a maximum power supply availability interval after turning off the alternator.

In the example shown in FIG. 2, at time $T_5$, the motor vehicle engine and thus the alternator starts again, whereby the vehicle battery 11 begins to be recharged and the voltage of the vehicle electrical system $U_B$ begins to rise quickly until at time $T_6$ where a second threshold value $U_2$, higher than the first threshold value $U_1$, is exceeded. When the power supply control unit 6 detects this upper threshold value $U_2$ being exceeded, it starts a timer at $T_6$ which runs for a fixed time interval $t_4$, during which the voltage of the vehicle electrical system $U_B$ should not fall again below the upper threshold value $U_2$. After the expiration of a fixed time interval $t_4$ without $U_B$ falling below the upper threshold value $U_2$, at time $T_7$, it is determined that the motor vehicle alternator has again assumed providing power supply. Therefore, at this instant $T_7$, the power supply control unit 6 reconnects the control electronics module 10 to the vehicle battery 11 and ultimately to the motor vehicle alternator. The operation of the control electronics module 10 then starts again. At this time, the auxiliary battery 7 is also recharged by the alternator.

If during time intervals $t_2$ or $t_3$ (i.e., between times $T_2$ and $T_3$ or $T_4$), a rise of the voltage of the vehicle electrical system $U_B$ above the upper threshold value $U_2$ is detected, the step described last has priority. That is, after expiration of time interval $t_4$, when the voltage of the vehicle electrical system $U_B$ during time interval $t_4$ has not fallen again below the upper threshold value $U_2$, the control electronics module 10 is connected again to the vehicle battery 11 or the alternator, whereby the power supply control unit 6 assumes that normal operation is present again with the alternator running.

As already described, the intervals $t_2$ and $t_3$ are preferably fixed, i.e., the corresponding switching process takes place without further measurements only based on the progression of time intervals $t_2$ and $t_3$. In an embodiment of the present invention, the time intervals or shut-off delays $t_2$ and $t_3$ are preferably by set by the operator by means of remote control, for example, via a mobile phone and the GSM module 12. A time interval or shut-off delay $t_2$ and $t_3$ of between 0 and a several days is feasible.

Alternatively, instead of making the switching decision at the end of the fixed time intervals or shut-off delays $t_2$ and $t_3$, the switching can be dependent on measurements. For example, the switching of the power supply from the auxiliary battery 7 to the battery 11 at time $T_3$ could take place using the charging state of the auxiliary battery 7 which is tracked via the corresponding measurements, and the disconnection of the control electronics module 10 from the vehicle battery at time $T_4$ could likewise take place, for example, using a third threshold value which is below the first threshold value $U_1$ for the voltage of the vehicle electrical system or battery $U_B$.

Instead of being utilized for the control electronics of the auxiliary heating device 2, the described battery discharge protection can also be used for other electrical accessory devices, such as theft warning systems, alarm systems, anti-jacking systems, active location devices, remote diagnosis, remote maintenance, and parameterization of control devices by means of GSM, GPRS, UMTS and other GSM applications. If there are a plurality of these electrical accessory devices, it is preferable to provide a single common power supply control unit 6 for all the electrical accessory devices.

What we claim is:

1. Process for operating an electrical accessory device in a motor vehicle having a vehicle battery and an associated alternator, the electrical accessory device being interfaced to electronic controls, a means for detecting the voltage of the vehicle electrical system, a power supply control unit connected to the electrical accessory device and the vehicle battery, and an auxiliary energy storage device rechargeable by the alternator and connected to the power supply control unit, the process comprising the steps of:

(a) separating the electrical accessory device from the vehicle battery by means of the power supply control unit, when detected battery voltage has fallen below a given first threshold value for a given first time interval;

(b) connecting the electrical accessory device to the auxiliary power storage device by means of the power supply control unit, and after expiration of a second time interval, disconnecting the electrical accessory device from the auxiliary power storage device; and (c) reconnecting the electrical accessory device to the vehicle battery by means of the power supply control unit, and after expiration of a third time interval, disconnecting the electrical accessory device from the vehicle battery, wherein steps a) to c) are performed in succession except that, whenever the detected voltage of the vehicle electrical system has exceeded a given second threshold value which is greater than the first threshold value for a given fourth time interval at any time after performance of step (a), the step of reconnecting the electrical accessory device to the vehicle battery by means of the power supply control unit is performed.

2. The process of claim 1, wherein, the second time interval, is predetermined.

3. The process of claim 1, wherein the third time interval is predetermined.

4. The process of claim 2, wherein at least one of the second and third time intervals are set by an operator via remote control.

5. An electrical device for a motor vehicle, the motor vehicle including a vehicle battery, an alternator, an electrical interface for an electrical accessory device, a means for detecting the voltage of the electrical system, and a power supply control unit for connecting the electrical accessory device to the vehicle battery and disconnecting the electrical accessory device from the vehicle battery according to detected battery voltage, comprising:

a rechargeable auxiliary energy storage device which is rechargeable by the alternator and which is connected to the power supply control unit, the power supply control unit further comprising:

means for separating the electrical accessory device from the vehicle battery when detected battery voltage has fallen below a given first threshold value for a given first time interval;

means for connecting the electrical accessory device to the auxiliary power storage device, and after expiration of a second time interval, disconnecting the electrical accessory device from the auxiliary power storage device; and means for reconnecting the electrical accessory device to the vehicle battery, and after expiration of a third time interval, disconnecting the electrical accessory device from the vehicle battery, and means for reconnecting the electrical accessory device to the vehicle battery when the detected voltage of the vehicle electrical system has exceeded a given second threshold value which is greater than the first threshold value for a given fourth time interval at any time after the means for separating has separated the electrical accessory device from the vehicle battery.

6. The device of claim 5, wherein the electrical interface is a wireless data transmission device.

7. The device of claim 6, wherein the data transmission means is based on a mobile telecommunications standard.

8. The device of claim 5, wherein the electrical interface is a control device for the electrical accessory device.

9. The device of claim 5, wherein the electrical accessory device is an auxiliary heating device.

10. The device of claim 5, wherein the power supply control unit is is associated with a plurality of electrical accessory devices and associated electrical interfaces.

* * * * *